United States Patent Office 3,647,765
Patented Mar. 7, 1972

3,647,765
UNSATURATED POLYAMIDES AND PROCESS
FOR OBTAINING SAME
Luigi Mortillaro and Mario Russo, Novara, and Vincenzo Guidotti, Milan, Italy, assignors to Montecatini Edison S.p.A., Milan, Italy
No Drawing. Filed Sept. 9, 1969, Ser. No. 856,474
Claims priority, application Italy, Sept. 11, 1968, 21,082/68
Int. Cl. C08g 20/20
U.S. Cl. 260—78 UA
16 Claims

ABSTRACT OF THE DISCLOSURE

Unsaturated linear polyamides having desirable properties are obtained by reacting or condensing a substituted fumaric acid with a diamine selected from the group consisting of specified aliphatic diamines, secondary cyclic diamines, diamines containing cycloalphatic rings, and diamines containing aromatic carbocyclic rings. The unsaturated linear polyamides of the instant invention are useful for preparing molded goods, sheets, films, and fibers.

---

The present invention relates to unsaturated polyamides having the recurring unit structure (I):

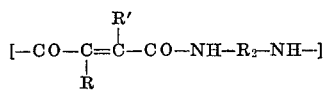

(I)

wherein the dicarbonyl radical

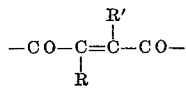

contained in the recurring unit is derived from a substituted fumaric acid, where R and R' are as defined hereinafter in connection with Formula II, and where R² together with the adjacent —NH— groups denotes the residue of an aliphatic diamine, of a cyclic secondary diamine, of a diamine containing cycloaliphatic rings, or of a diamine containing aromatic carbocyclic rings.

It is already known from certain earlier patents (Italian Pats. Nos. 793,190, 793,191, 793,192 and 793,193) that it is possible to obtain polyfumaramides by the reaction of fumaric acid with various diamines.

The polymerization method used in the above cited patents consists in reacting a dihalide of fumaric acid with a diamine, in solution or according to the interfacial method.

The polyfuramides that are obtained in this way are highly heat-resistant but in general they are infusible and, in particular those derived from linear aliphatic diamines, from cycloaliphatic diamines and from non-substituted aromatic diamines, are soluble only in strong acids such as concentrated sulphuric acid or trifluoroacetic acid. This fact tends to limit the possibility of processing said polyfumaramides.

According to the present invention, it has now been discovered that if the diamine is reacted with a dihalide of a substituted fumaric acid of the general Formula II:

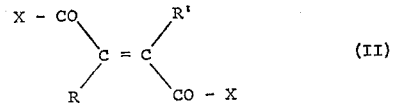

(II)

(wherein X is halogen; R is H, alkyl, or halogen; and R' is alkyl, or halogen), instead of with a dichloride of fumaric acid, there will be obtained high molecular weight polyamides displaying a good thermal resistance, and which, unlike the corresponding polyamides derived from the non-substituted fumaric acid, in many instances melt or soften so that they can be readily molded into shaped objects by simply heating under pressure. Moreover, these polyamides are not only soluble in strong acids, but also in a much wider range of solvents than are the polyamides derived from non-substituted fumaric acid.

Non-limiting examples of dihalides of substituted fumaric acid which may be used according to the present invention are: the dichloride of methylfumaric acid (mesaconic acid), the dichloride of dimethylfumaric acid, the dichloride of chlorofumaric acid, and the dichloride of dibromofumaric acid.

More particularly, the present invention relates to unsaturated polyamides containing the recurring unit (I) which are obtained by reacting a dihalide, preferably a dichloride, of a substituted fumaric acid (II) with aliphatic diamines, secondary cyclic diamines (like the piperazines and their position isomers), diamines containing cycloaliphatic rings or diamines containing aromatic carbocyclic rings.

Aliphatic diamines that may be used according to this invention have the structure (III):

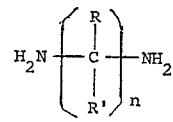

wherein:
$n$=an integer from 2 to 12,
R and R', equal to or different from each other, may be hydrogen, alkyl or aryl.

Specific examples of usable diamines are: 1,2-ethylenediamine and its homologs up to 1,12-dodecamethylenediamine; 1,2-propylenediamine; 2,2,4-trimethylhexamethylenediamine and the isomer 2,4,4-trimethylhexamethylenediamine. Whenever the diamines have one or more optically active carbon atoms, they may be used also in the optically active forms (dextrorotatory and levorotatory) besides being used in the racemic form.

Secondary cyclic diamines that may be used according to this invention have the structures (IVa), (IVb) and (IVc):

(IVa) 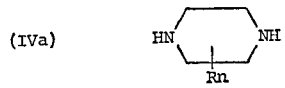

(IVb) 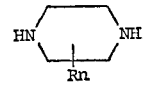

(IVc) 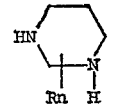

wherein
$n$ is either zero or an integer from 1 to 8;
R may be an alkyl, in particular a methyl or ethyl group, or an aryl, alkoxy or aryloxy group.

Where $n>1$, the substituents R may be present in any steric position with respect to the ring; one may use the pure stereoisomers (cis or trans) as well as their mixtures.

Specific substituted diamines of the foregoing kind that may be used for the purpose are: mono-, di-, tri-, tetramethyl-piperazines and their ethyl analogues. Other examples are: 2,3,5-tri-n-butylpiperzine; 2,3,5,6-tetraphenylpiperazine; 2,3,5,6-tetratolylpiperazine; 2,5-ditolylpiperazine; tetra - hydroquinonoxaline, per - hydrophenazine; phenylethylpiperazine; phenylmethylpiperazine; diphenylpiperazine; and phenylpiperazine.

Diamines containing cycloaliphatic rings that may be used according to this invention have the structure (V):

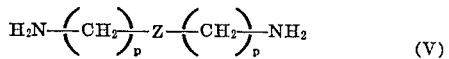

wherein Z may be:

(VI)

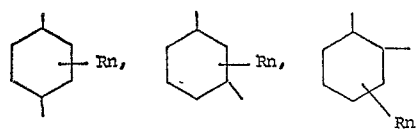

or (VI)

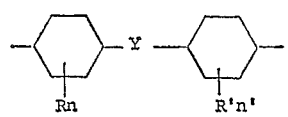

In (VI), Y may be $Y_{(g)}$ wherein $g$ is zero or 1, —$CH_2$—, —$C(CH_2)_2$—, —$C(CH_3)_2$—, —O—, —$SO_2$— or —$Si(CH_3)_2$—. In (V), $p$ and $p'$ (which may be equal to or different from each other) are either zero or an integer from 1 to 6. R and R' have the meaning given above under (III).

Specific non-substituted diamines of the foregoing kind that may be used are: 1,4-cis or trans diaminocyclohexane; 1,3-cis or trans diaminocyclohexane; 1,2-cis or trans diaminocyclohexane; 1,4-cis or trans bis (aminomethyl) cyclohexane; 1,3-cis or trans bis (aminomethyl)cyclohexane; 1,2-cis or trans bis (aminomethyl)cyclohexane; the homologues of bis(aminomethyl) compounds. Furthermore, mixtures of the corresponding cis-trans stereoisomers may be used. Other examples are: bis(p-aminocyclohexyl)methane; bis(p - aminocyclohexyl)ether, in their different pure or impure steroisomeric forms.

In (V) and (VI), $n$ and $n'$ (equal to or different from each other) are either equal to zero or are an integer from 1 to 10; R and R' (which may be either equal to or different from each other) may be hydrogen or an alkyl, an aryl, an aryloxy or an alkoxy group. When there is an even number of substituents it is preferred that they be arranged symmetrically in the cyclo hexane nucleus. An example of such substituted diamines that may be used according to this invention is 3-aminomethyl-3,5,5-trimethylcyclohexylamine (isophoronediamine).

Diamines having aromatic carbocyclic rings that may be used according to this invention have the structure (VII):

(VII)

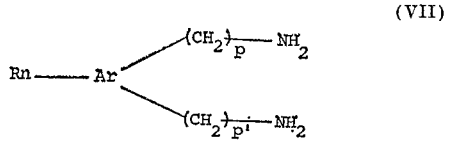

wherein Ar is an aromatic carbocyclic radical with one or more condensed rings, such as phenylene, naphthalene, anthrylene or a system with several aromatic rings of the type (VIII):

(VIII)

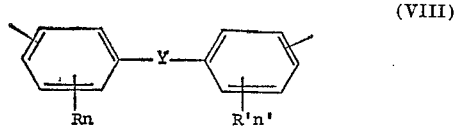

In (VII) and (VIII), $p$, $p'$, Y, R and R' have the same meanings already indicated above under (V) and (VI).

In (VII) and (VIII), $n$ and $n'$ are either equal to zero or are an integer between 1 and the number of hydrogen atoms directly bonded to the aromatic system.

Specific diamines of the foregoing kind that may be conveniently used are: p-phenylenediamine and the ortho- and metaisomers; p-xylylenediamine and the ortho- and meta - isomers; benzidene; naphthylenediamine; bis(p-aminophenyl)methane; bis(p-aminophenyl)ether; 3,3'-diaminodiphenylmethane.

The polymers which are the object of this invention are obtained by reacting the diamine, generally dissolved in the liquid phase, with the dihalide (in particular with the dichloride) of the substituted fumaric acid, generally dissolved in a second liquid phase which is immiscible with the first liquid phase. In general, the diamine is reacted while dissolved in an aqueous phase while the dihalide of the substituted fumaric acid is reacted while in a solvent immiscible with water. The diamine may, however, be dispersed rather than dissolved in the aqueous phase and then reacted with the dihalide of the substituted fumaric acid dissolved in a water-immiscible phase.

The temperature of the polycondensations may vary from —70° C. up to the decomposition temperature of the reactants. However, the preferred temperature range is from —20° to +100° C.

The solvents used for the purpose must be inert with respect to the specific reactant; however, they may be reactive in respect of the reactant contained in the other phase, but their reactivity must be smaller than that of the reactant that they contain. Solvents specifically suited for the dihalide of the substituted fumaric acid are for instance: benzene, toluene, the xylenes, chlorobenzene, carbon tetrachloride, chloroform, dichloromethane, n-hexane, n-octane sym-dichloroethane, sym-tetrachloroethane, or mixtures thereof.

The polymerization reaction may be carried out without stirring or, better still, with stirring in such a way as to ensure a fine dispersion of the phases.

The concentrations of the dihalide of the substituted fumaric acid and of the diamine, in their respective phases, may be varied over a very wide range of values that may extend from the reactant at 100% to very dilute solutions of the order of 0.001 mole per liter. Furthermore, stoichiometrically equivalent quantities of the reactants are not required. In many cases there have been obtained polymers with high molecular weights by using an excess of the diamine with respect to the dihalide of the substituted fumaric acid.

Normally, to the phase containing the diamine there is added an acceptor for the haloid acid which forms during the poly-condensation. This acceptor may be an inorganic base, an organic base or the diamine itself. Particularly suitable acceptors for the haloid acid are for instance: potassium hydroxide, sodium carbonate, magnesium oxide, triethylamine. It is not essential, however, that the aqueous phase be basic; one may also operate in a neutral or acid medium.

In some cases the reaction may be very conveniently conducted by using as solvent for the diamine the same solvent as is employed for the dihalide of the substituted fumaric acid, that is, by operating not under interfacial conditions but according to a technique known as "polycondensation in solution" (P. W. Morgan: "Condensation Polymers: By Interfacial and Solution Methods," Interscience Publishers, John Wiley & Sons, 1965). Also in this case the operating conditions (concentration of the reactants, temperature, etc.) may vary according to that described in connection with the interfacial method.

The polymers obtained according to methods described previously are solids that decompose at temperatures between 220° and 340° C., in an inert atmosphere.

The polymers according to the present invention, on the other hand, are soluble in a wider range of solvents than that of the polyfumaramides of the prior art, solvents that are quite common and easily removable; furthermore, they often have a melting or softening point that readily allows their molding into finished articles by simple heating under pressure.

Thus, for instance, amongst the polyamides made from linear aliphatic diamines, while the polyfumaramides are soluble only in strong acids such as concentrated sulphuric acid or trifluoroacetic acid, the poly-1,2-ethylene-mesaconamide is also soluble in other solvents such as formic acid, m-cresol, sym-tetrachloroethane/phenol mixture (40/60 by weight), while the poly-1,3-propylene-mesaconamide is soluble in HCOOH, m-cresol, sym-tetrachloroethane/phenol mixture and CHCl$_3$/CH$_3$OH and CH$_2$Cl$_2$/CH$_3$OH mixtures in suitable compositions. Furthermore, with the exception of poly-1,2-ethylene-mesaconamide, these polyamides are moldable, for instance, by heating under pressure.

Amongst the polyamides made from secondary cyclic diamines, the poly-trans-2,5-dimethylpiperazine-mesaconamide, besides being soluble in the solvents for the corresponding polyfumaramides, is also soluble in CHCl$_3$ and in CH$_2$Cl$_2$. Thus, amongst the polyamides made from diamines having cycloaliphatic rings without substituents, while the polyfumaramides are soluble only in strong acids such as concentrated sulphuric acid or trifluoroacetic acid, the poly-cyclohexylene-paradimethylene-mesaconamide is soluble also in other solvents such as HCOOH, m-cresol, sym-tetrachloroethane/phenol mixture and CHCl$_3$/CH$_3$OH and CH$_2$Cl$_2$/CH$_3$OH mixtures in suitable ratios. This polyamide is, furthermore, moldable by heating under pressure.

Finally, amongst the polyamides made from diamines having aromatic rings without substituents, while the polyfumaramides are soluble only in strong acids such as for instance concentrated sulphuric acid or trifluoroacetic acid, the poly-m-xylylenemesaconamide is also soluble in other solvents such as HCOOH, m-cresol and sym-tetrachloroethane/phenol mixtures. Furthermore, the poly-m-xylylenemesaconamide is moldable, for instance, by heating under pressure.

The molecular weight of all these polymers depends on the diamine used, on the reaction conditions, such as stirring speed, concentration of the reactants, ratios between the volumes of the solutions of the reactants, the reaction temperature, the type of organic solvent, time of feeding of the organic phase (or of the aqueous phase if the reaction is carried out with reversed addition of the soluutions), the presence or absence of an acceptor for the haloid acid and its nature, the presence or absence of emulsifying agents, etc.

The indication of the molecular weight of the polymers is given by the value of the inherent viscosity, determined on solutions of the polymer in H$_2$SO$_4$ at 98% by weight, at a concentration of 0.5 g. of polymer per 100 ml. of solvent at 30° C. The polymers obtained according to the present invention show an inherent viscosity greater than 0.2 dl./g.

The polymers may be obtained from their solutions in the form of fibers and films, and in those cases in which they can be melted or softened they may be shaped into finished articles by heating under pressure.

The thermal stability of the polymers, as is indicated in the following examples, is expressed in terms of the temperature up to which the polymer does not show a significant loss in weight under progressive heating in an inert atmosphere (the rate of heating being equal to about 2.7° per minute).

The following detailed working examples illustrate the present invention, the procedure and the different conditions for obtaining the polymers, the effects of the variations of some of the reaction conditions on the characteristics of the resulting polymer, on the yield and on the viscosity. Accordingly, these examples are to be considered as purely illustrative and not as limiting the spirit or scope of the invention.

EXAMPLE 1

Into a 1 liter flask, fitted with a mechanical stirrer, were introduced 400 cc. of an aqueous solution containing 7.37 g. of trans-2,5-dimethylpiperazine and 7.84 g. of KOH. To this solution, kept under stirring at room temperature, were then rapidly added 100 cc. of a solution of 11.31 g. of dichloride of methylfumaric acid (mesaconyl dichloride) in chloroform. Immediately some polymer formed that separated as a white solid.

The suspension was subjected to stirring for 10 minutes. Then the chloroform was removed by distillation in a countercurrent of steam, the suspension was filtered and the polymer washed with hot water and then placed in an oven to dry at 60° C. under vacuum. The yield of polymer amounted to 43%.

The polymesaconamide thus obtained showed an inherent viscosity of 1.24 and turned out to be soluble in concentrated sulphuric acid, HCOOH, sym-tetrachloroethane/phenol (40/60 by weight), CHCl$_3$/CH$_3$OH (for instance 88/12 by weight), CH$_2$Cl$_2$/CH$_3$OH (for instance 92/8 by weight), as well as in other solvents such as CHCl$_3$ and CH$_2$Cl$_2$.

The polymer showed a thermal stability of about 340° C. From the solutions of polymer in solvents, such as HCOOH, chloroform/methanol mixtures, etc. transparent and resistant films can be obtained by conventional methods.

EXAMPLE 2

This example differs from Example 1 in that the diamine used was trimethyl-hexamethylenediamine (a mixture of the 2,2,4- and 2,4,4-isomers).

The starting solutions had the following composition: 400 cc. of an aqueous solution containing 11.15 g. of the diamine and 8.14 g. of KOH to which were added, according to the procedures described in Example 1, 100 cc. of a solution of 11.77 g. of mesaconyl dichloride in chloroform.

The polymer yield amounted to 81%; the inherent viscosity was 0.69. The polyamide showed a thermal stability of about 220° C.

This polyamide may be molded, for instance, by heating it at 160° C. under pressure. Depending on the molding conditions, it is possible to obtain from this polyamide transparent films and plates as well as other shaped articles.

EXAMPLE 3

Into a 1 liter flask, provided with a mechanical stirrer, were introduced 250 cc. of an aqueous solution containing 9.50 g. of 1,3-propylenediamine and 4.88 g. of KOH. To this solution, kept under stirring at room temperature, were rapidly added 250 cc. of a solution of 6.97 g. of mesaconyl dichloride in benzene. There immediately formed a polymer which separated as a white solid. The suspension was then stirred for 10 minutes and was then subjected to distillation in a current of steam in order to remove the benzene.

After filtering, washing and drying (as described in Example 1) there was obtained the polyamide with a yield of 35%; the inherent viscosity amounted to 1.36. The polymer showed a thermal stability of about 210° C.

The polymer also turned out to be soluble not only in concentrated sulphuric acid but also in other solvents such as for instance: HCOOH, sym-tetrachloroethane/phenol (40/60 by weight), m-cresol, CHCl$_3$/CH$_3$OH mixtures (for instance 80/20 by weight), contrary to the case with the corresponding polyfumaramide.

From solutions of the polymer of this example in solvents such as HCOOH, CHCl$_3$/CH$_3$OH or CH$_2$Cl$_2$/CH$_3$OH transparent and resistant films can be obtained by conventional methods.

The polyamide prepared according to this example may be molded, for instance, by heating it at 140°–150° C. under pressure. Depending on the molding conditions, one may obtain from it films, transparent plates and other shaped articles.

EXAMPLE 4

This example differs from Example 1 in that the diamine used was 1,2-ethylenediamine.

The staring solutions consisted of: 400 cc. of an aqueous solution containing 4.03 g. of diamine and 7.84 g. of KOH to which were admixed, according to the procedure described in Example 1, 100 cc. of a solution of 11.18 g. of mesaconyl dichloride in chloroform.

The polymer yield amounted to 31%, while the inherent viscosity was 0.76. The polyamide turned out to be soluble, not only in concentrated sulphuric acid but also in other solvents such as HCOOH, m-cresol, sym-tetrachloroethane/phenol (40/60 by weight), contrary to the case with the corresponding polyfumaramide.

The polymer of this example showed a thermal stability of about 230° C., and from solutions thereof in HCOOH transparent and resistant films were obtained in the usual way.

EXAMPLE 5

Into a 1-liter flask, fitted with a mechanical stirrer and kept in an atmosphere of nitrogen, were introduced 300 cc. of a solution consisting of 6.61 g. of mesaconyl dichloride in chloroform. To this solution, maintained under stirring at room temperature, were added for one hour, in a nitrogen atmosphere, 300 cc. of a solution of 9.04 g. of trans-2,5-dimethylpiperazine in chloroform. To this solution, kept under stirring at room temperature, there were admixed in 1 hour, under nitrogen, 300 cc. of a solution of 9.04 g. of trans-2,5-dimethylpiperazine in chloroform. This mixture was then subjected to stirring for another 10 minutes and the polymer was then precipitated by pouring the mixture into 2 liters of n-hexane, while stirring.

After filtering, washing and drying (as described in Example 1), the polymer was obtained with a yield of 95% (referred to the mesaconyl dichloride). The inherent viscosity was equal to 2.41.

EXAMPLE 6

Into a 1-liter flask, fitted with a mechanical stirrer, were introduced 400 cc. of an aqueous solution containing 3.82 g. of trans-2,5-dimethylpiperazine and 8.51 g. of sodium carbonate. To this solution, kept under stirring at a temperature of −5° C., were rapidly admixed 70 cc. of a solution of 5.58 g. of mesaconyl dichloride in dichloroethane. There formed at once a polymer that separated as a white solid. The suspension was thereupon treated as described in Example 1. The polyamide yield was 90%, while the inherent viscosity amounted to 0.82.

EXAMPLE 7

Into a 1-liter flask, fitted with a mechanical stirrer, were introduced 400 cc. of an aqueous suspension containing 2.91 g. of 1,10-decamethylenediamine and 7.94 g. of KOH. To this suspension, kept under stirring at room temperature, were added rapidly 100 cc. of a solution of 2.75 g. of mesaconyl dichloride in chloroform. The suspension was then stirred for 10 minutes and then treated as described in Example 1. The yield amounted to 77%, while the inherent viscosity amounted to 1.77.

The polymesaconamide thus obtained turned out to be soluble not only in concentrated sulphuric acid, but also in other solvents such as: HCOOH, m-cresol, sym-tetrachloroethane/phenol (40/60 by weight), $CHCl_3/CH_3$ mixtures (for instance in a ratio 88/20 by weight), $$CH_2Cl_2/CH_3OH$$

mixtures (for instance in a 80/20 ratio by weight).

The polymer showed a thermal stability of about 230° C. The polyamide turned out to be moldable by heating at 165° C. under pressure and, depending on the molding conditions, there can be obtained films, transparent plates or other shaped articles.

EXAMPLE 8

This example differed from Example 1 in that the diamine used was bis(p-aminomethyl)cyclohexane.

The starting solutions had the following composition: 400 cc. of an aqueous solution containing 9.73 g. of the diamine and 7.86 g. of KOH to which were added (according to the procedures described in Example 1) 100 cc. of a solution of 11.42 g. of mesaconyl dichloride in chloroform.

The polymer yield amounted to 45%, while the inherent viscosity was 0.33.

The polyamide turned out to be soluble not only in concentrated sulphuric acid but also in other solvents such as HCOOH, m-cresol, sym-tetrachloromethane/phenol (40/60 by weight), $CHCl_3/CH_3OH$ mixtures (in ratios, for instance, of 88/12 and 70/30 by weight), $$CH_2Cl_2/CH_3OH$$

mixtures (for instance in a ratio of 80/20 by weight), contrary to the case with the corresponding polyfumaramide.

The polymer of this example showed a thermal stability of 220° C. The polyamide turned out to be moldable by simply heating at 160° C., under pressure, and, depending on the molding conditions, it was possible to obtain films, transparent plates or other shaped articles by conventional methods well known in the art.

EXAMPLE 9

Into a 1 liter flask, fitted with a mechanical stirrer, were introduced 250 cc. of an aqueous suspension containing 22.66 g. of p-phenylenediamine-di-chlorohydrate and 18.85 g. of KOH. To this suspension, maintained under stirring at room temperature, were admixed rapidly 250 cc. of a solution of 6.97 g. of mesaconyl dichloride in benzene. This suspension was then treated as described above in Example 3.

The polymer yield amounted to 79%, while the inherent viscosity was 0.24.

The polyamide turned out to be soluble not only in concentrated sulphuric acid but also in other solvents such as dimethylformamide containing 5% of LiCl. The polymer showed a thermal stability of about 235° C.

EXAMPLE 10

This example differs from Example 1 in that the diamine used was m-xylylenediamine.

The starting solutions had the following composition: 400 cc. of an aqueous solution containing 9.19 g. of the diamine and 7.76 g. of KOH to which were added, according to the procedures described above in Example 1, 100 cc. of a solution of 11.27 g. of mesaconyl dichloride in chloroform.

The polymer yield amounted to 75%, while the inherent viscosity was 0.41.

The polyamide turned out to be soluble not only in concentrated sulphuric acid but also in other solvents such as HCOOH, m-cresol, sym-tetrachloroethane/phenol (in a ratio of 40/60 by weight).

The polymer showed a thermal stability of about 230° C., while the polyamide turned out to be moldable, for instance, by heating at 160° C. under pressure, and, depending on the molding conditions, it was possible to obtain films, transparent plates or other shaped articles.

EXAMPLE 11

This example differs from Example 1 in that the diamine used was 3-aminomethyl-3,5,5-trimethylcyclohexylamine, or isophoronediamine.

The starting solutions had the following composition: 400 cc. of an aqueous solution containing 11.58 g. of the diamine and 7.82 g. of KOH to which were added, following the same procedures as those described above in Example 1, 100 cc. of a solution of 11.36 g. of mesaconyl dichloride in chloroform.

The polymer yield turned out to be 61%, while the inherent viscosity amounted to 0.25.

The polyamide turned out to be soluble not only in concentrated sulphuric acid but also in other solvents such as HCOOH, m-cresol, sym-tetrachloroethane/phenol (in a ratio of 40/60 by weight), CHCl₃/CH₃OH mixtures (for instance in ratios of 88/12 and 70/30 by weight),

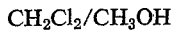

$CH_2Cl_2/CH_3OH$ mixtures (for instance in ratios of 92/8 and 80/20 by weight).

The polymer of this example showed a thermal stability of about 220° C. The polyamide turned out to be moldable by heating at 180° C. under pressure. Depending on the molding conditions, it is possible to obtain films, transparent plates or other shaped articles.

EXAMPLE 12

This example differs from Example 1 in that the diamine used was piperazine.

The starting solutions had the following composition: 400 cc. of an aqueous solution containing 5.79 g. of the diamine and 7.73 g. of KOH to which were added, by following the procedures described above in Example 1, 100 cc. of a solution 11.22 g. of mesaconyl dichloride in chloroform.

The polymer yield turned out to be 72%, while the inherent viscosity amounted to 0.81.

The polyamide turned out to be soluble not only in concentrated sulphuric acid, HCOOH, m-cresol, sym-tetrachloroethane/phenol mixture (in a ratio of 40/60 by weight) but also in other solvents such as

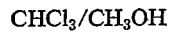

$CHCl_3/CH_3OH$ mixtures (for instance in a ratio of 88/12 by weight), $CH_2Cl_2/CH_3OH$ mixtures (for instance in a ratio of 80/20 by weight), contrary to what happens in the case of the corresponding polyfumaramide.

The polymer of this example showed a thermal stability of about 330° C.

EXAMPLE 13

Into a 1-liter flask, fitted with a mechanical stirrer and kept in a nitrogen atmosphere, were introduced 200 cc. of a solution of 3.37 g. of piperazine and 11.6 g. of triethylamine in chloroform. To this solution, maintained under stirring at room temperature, were added rapidly, in a nitrogen atmosphere, 180 cc. of a solution of 6.53 g. of mesaconyl dichloride in chloroform. The feeding funnel was washed with an additional quantity of 20 cc. of pure chloroform. This solution was then stirred for a further 10 minutes and the polymer was then precipitated by pouring the solution into 1 liter of n-hexane, with stirring. After washing and drying (as described in Example 1) there was obtained a polymer with a yield mounting to 83%. The inherent viscosity turned out to be 0.68.

EXAMPLE 14

In this example the same operational procedures as in Example 1 were followed, but with the difference that there was used 1,6-hexamethylenediamine as the diamine.

The solutions had the following composition: 400 cc. of an aqueous solution containing 7.84 g. of the diamine and 7.79 g. of KOH to which were added 100 cc. of chloroform containing 11.26 g. of mesaconyl dichloride, following the same procedures as in Example 1. At the end of the reaction, the polymer was filtered, purified repeatedly with hot water and then dried in an oven at 60° C. under vacuum.

The polymer yield amounted to 75%, while the inherent viscosity was 1.46.

The polyamide turned out to be soluble not only in concentrated sulphuric acid but also in HCOOH, m-cresol, sym-tetrachloroethane/phenol mixture (in a ratio of 40/60 by weight) and chloroform/methanol mixture (for instance in a ratio of 88/12 by weight).

The polymer showed a thermal stability of 220° C., while the polyamide turned out to be moldable at 150°–160° C. under pressure and, depending on the molding conditions, yielded films and transparent plates or other shaped articles.

EXAMPLE 15

Into a 1-liter flask, fitted with a mechanical stirrer and kept in a nitrogen atmosphere, was introduced a solution of 7.42 g. of the dichloride of monochlorofumaric acid (prepared according to O. Diels, W. E. Thiele, Ber. 71 B, 1173–8 (1938).

*Analysis.*—Cl (percent): calculated=56.7; found (percent): 56.7) in 300 cc. of chloroform.

To this solution, maintained under stirring at room temperature, was admixed in 1 hour, in a nitrgen atmosphere, a solution of 9.04 g. of trans-2,5-dimethyl-piperazine in 300 cc. of chloroform.

The mixture was then stirred for 10 minutes and the polymer was then precipitated by diluting in 2 liters of n-hexane, with vigorous stirring.

After filtering and repeated purification with $H_2O$, the product was dried in an oven at 50° C. under vacuum. The polymer yield amounted to 85%. The inherent viscosity was 0.49 (the analysis showed Cl (percent): calculated=15.5; found=15.2).

The polyamide thus obtained turned out to be soluble not only in concentrated sulphuric acid, m-cresol, HCOOH but also in $CHCl_3/CH_3OH$ mixtures (for instance in a ratio 88/12 by weight) and in chloroform alone.

The thermal stability of the polymer proved to be about 230° C.

EXAMPLE 16

Into a 1-liter flask, fitted with a mechanical stirrer, was introduced a solution of 3.81 g. of trans-2,5-dimethyl-piperazine and 8.50 g. of $Na_2CO_3$ in 400 cc. of water. To this solution, maintained under stirring at room temperature, was admixed a solution of 10.38 g. of dichloride of dibromofumaric acid (prepared according to Ott, Ann. 392, 267 (1912); analysis showed Cl (percent): calculated: 22.8, found: 22.7; Br (percent): calculated=51.4, found=51.0) in 70 cc. of methylene chloride.

The suspension of the polymer that immediately formed was stirred for 10 minutes. After filtering and repeated purification with $H_2O$, the polymer product was dried in an oven under vacuum at 50° C.

The polymer yield was 82%; the inherent viscosity amounted to 0.26. The analysis showed: Br (percent): calculated 45.4, found 44.5.

The polymer turned out to be soluble in concentrated sulphuric acid, in a sym-tetrachloroethane/phenol mixture (in a 40/60 by weight ratio), and in hot m-cresol.

The thermal stability of the polymer amounted to about 230° C.

EXAMPLE 17

Into a 1-liter flask, fitted with a mechanical stirrer, was introduced a solution of 6.02 g. of hexamethylenediamine and 5.95 g. of KOH in 400 cc. of water. To this solution, maintained under stirring at room temperature, was admixed a solution of 16.1 g. of dichloride of dibromofumaric acid in 100 cc. of chloroform. There was an immediate formation of polymer; the stirring was interrupted after 15 minutes and the suspension of the polymer was treated as described above in Example 16.

The yield of polymer turned out to be 72%, while the inherent viscosity amounted to 0.46. The analysis showed: Br (percent): calculated=45.1; found=44.5.

The polyamide turned out to be soluble not only in concentrated sulphuric acid and in a sym-tetrachloroethane/phenol mixture (in a 40/60 by weight ratio) but also in dimethylformamide and in dimethylsulphoxide.

The thermal stability of the polymer amounted to about 210° C.

EXAMPLE 18

Into a 1-liter flask, fitted with a mechanical stirrer, was introduced a solution of 3.81 g. of trans-2,5-dimethylpiperazine and 8.49 g. of $Na_2CO_3$ in 400 cc. of water. To this solution, kept under stirring at room temperature, was admixed a solution of 6.05 g. of dichloride of dimethylfumaric acid (prepared according to E. Ott, Ber. 61, 2124 (1928)). (The analysis showed Cl (percent): calculated=39.17, found=39.01), in 70 cc. of methylene chloride.

The suspension of polymer was stirred for 15 minutes and was then treated as described above in Example 16.

The yield turned out to be 90%, while the inherent viscosity was 0.74. The analysis showed: calculated (percent): C=64.8; N=12.6; H=8.2; found (percent): C=64.6; N=12.4; H=8.2.

The polymer turned out to be soluble not only in concentrated sulphuric acid, HCOOH, sym-tetrachloroethane/phenol mixture (in a ratio, for instance, of 40/60 by weight), m-cresol but also in the mixtures $CHCl_3/CH_3OH$ (for instance in a ratio 88/12 by weight) and $$CH_2Cl_2/CH_3OH$$

(for instance in an 80/20 by weight ratio).

From solutions of the polymer in solvents such as: HCOOH, $CHCl_3/CH_3OH$ or $CH_2Cl_2/CH_3OH$ mixtures, there are obtained transparent and resistant films.

The polymer of this example showed a thermal stability of about 370° C.

What is claimed is:

1. A film and fiber forming unsaturated linear polyamide consisting essentially of the polymeric condensation product between a dihalosubstituted fumaric acid of the general formula

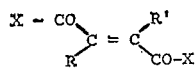

wherein X is halogen; R is H, alkyl or halogen; R' is alkyl or halogen, and a diamine selected from among the following groups:

(a) aliphatic diamines having the structure:

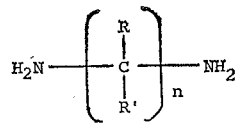

wherein:
  $n$ is an integer from 2 to 12,
  R and R' which may be equal to or different from each other may be hydrogen, alkyl or aryl;

(b) diamines having cycloaliphatic rings of the structure:

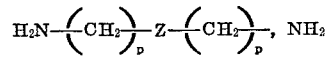

wherein Z may be:

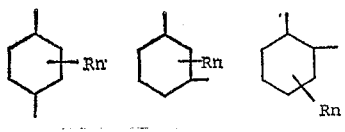

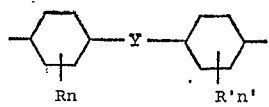

Y being $Y_{(g)}$ wherein g is zero or 1, $-CH_2-$, $-(CH_2)_2-$, $-C(CH_3)_2-$, $-O-$, $-SO_2-$ or $-Si(CH_3)_2-$; p and p', equal to or different from each other, are equal to zero or to an integer from 1 to 6; n and n', equal to or different from each other, are equal to zero or are an integer from 1 to 10; R and R', equal to or different from each other, have the meaning already specified under (b); and the groups $H_2N(CH_2)_p$ and $H_2N(CH_2)_{p'}$ may be arranged in a cis or trans position with respect to the cyclohexane ring;

(c) diamines having aromatic carbocyclic rings of the structure:

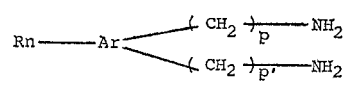

wherein Ar is an aromatic carbocyclic radical with one or more condensed rings, or a system of several aromatic rings of the type:

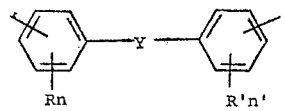

wherein $n$ and $n'$, equal to or different from each other, are equal to zero or to a number comprised between 1 and the number of hydrogen atoms directly bonded to the aromatic system; p and p', Y, R and R' have the same meaning as already specified under (c);

(d) secondary cyclic diamines of the structure:

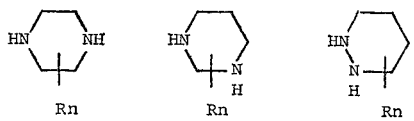

wherein $n$ is equal to zero or to an integer from 1 to 8, and R has the meaning specified under (a); and when $n>1$, the different R radicals may be arranged in any steric position with respect to the ring.

2. A film and fiber forming unsaturated linear polyamide according to claim 1, having a decomposition temperature in an inert gas atmosphere between 220° C. and 340° C.

3. A film and fiber forming unsaturated polyamide according to claim 1, soluble in concentrated sulfuric acid and in organic solvents.

4. A film and fiber forming unsaturated polyamide according to claim 3, soluble in an organic solvent selected from the group consisting of dimethyl formamide (containing 5% LiCl), HCOOH, chloroform/methanol mixtures, chloroform/methanol mixtures, methylene chloride/methanol mixtures, chloroform and methylene chloride.

5. A molded good, sheet, film or fiber of the polymer defined in claim 1.

6. Film and fiber forming poly 3-aminomethyl-3,5,5-trimethylcyclohexylaminemesaconamide.

7. Film and fiber forming poly 1,2-ethylenemesaconamide.

8. Film and fiber forming poly 1,3-propylenemesaconamide.

9. Film and fiber forming poly 1,10-decamethylenemesaconamide.

10. Film and fiber forming poly trimethylhexamethylenemesaconamide.

11. Film and fiber forming poly piperazinemesaconamide.

12. Film and fiber forming poly trans-2,5-dimethylpiperazinemesaconamide.

13. Film and fiber forming poly 1,4- cyclohexylenedimethylenemesaconamide.

14. Film and fiber forming poly m-xylylenemesaconamide.

15. Film and fiber forming poly p-phenylenemesaconamide.

16. Film and fiber forming poly 1,6-hexamethylenemesaconamide.

References Cited

UNITED STATES PATENTS

| | | | |
|---|---|---|---|
| 2,174,619 | 10/1939 | Carothers | 260—78 |
| 3,081,281 | 3/1963 | Beghin | 260—78 |
| 3,143,527 | 8/1964 | Wittbecker | 260—78 |
| 3,352,831 | 11/1967 | Schmitt et al. | 260—78 |
| 3,497,479 | 2/1970 | Cassar | 260—78 |

HAROLD D. ANDERSON, Primary Examiner

U.S. Cl. X.R.

260—30.8 R, 30.8 DS, 31.2 N, 32.6 N, 33.4 R, 33.8 R, 47 CZ